United States Patent
Steiner

(10) Patent No.: US 6,616,848 B2
(45) Date of Patent: Sep. 9, 2003

(54) DIE LUBE RECOVERY SYSTEM AND METHOD

(75) Inventor: Michael R. Steiner, New Bremen, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/975,227

(22) Filed: Oct. 11, 2001

(65) Prior Publication Data

US 2003/0070994 A1 Apr. 17, 2003

(51) Int. Cl.[7] .............................................. B01D 43/00
(52) U.S. Cl. ........................ 210/744; 210/806; 210/86; 210/97; 210/168; 210/521
(58) Field of Search ................................ 210/744, 806, 210/86, 97, 168, 521

(56) References Cited

U.S. PATENT DOCUMENTS

| | | | |
|---|---|---|---|
| 4,095,571 A | | 6/1978 | Fleetwood et al. |
| 4,361,488 A | | 11/1982 | White et al. |
| 4,655,938 A | * | 4/1987 | Fragala |
| 4,721,150 A | | 1/1988 | Thurner |
| 5,259,225 A | | 11/1993 | Koch |
| 5,507,307 A | | 4/1996 | Montegari et al. |
| 5,772,871 A | | 6/1998 | Lyon et al. |
| 5,948,274 A | | 9/1999 | Lyon et al. |

\* cited by examiner

Primary Examiner—Betsey Morrison Hoey
(74) Attorney, Agent, or Firm—Rankin, Hill, Porter & Clark LLP; Alan T. McDonald; Vincent Ciamacco

(57) ABSTRACT

A die lube recovery and recycling system includes a weir tank, a filtration assembly, and a holding tank. The weir tank receives used, dirty die lube and filters large particles therefrom. Preliminarily filtered die lube is pumped through the filtration assembly and reconditioned die lube is delivered to the holding tank. A level of reconditioned die lube in the holding tank is monitored and, the die lube is replenished with fresh die lube from a fresh die lube source when the level falls below a predetermined level. A die lube pressure booster is used to withdraw die lube from the holding tank, pressurize the withdrawn die lube, and spray the pressurized die lube on a die in a casting machine.

18 Claims, 4 Drawing Sheets

DIE LUBE RECOVERY SYSTEM AND METHOD

BACKGROUND OF THE INVENTION

1. Field of the Invention

The present invention is directed toward metal casting processes and, more particularly, toward a method and device for recovering and recycling die lubrication used in such metal casting processes.

2. Description of Related Art

In metal casting applications, it is common practice to spray lubricating agents on the dies to cool the dies and to assist in releasing the cast part from the dies. The lubricating or release agents are diluted with water to varying degrees depending upon the part being made and the specific problem being addressed. For example, a normal ratio of water to lubricant may be about 70:1, and a ratio of water to release agent of 25:1 may be used in situations wherein the molded material sticks to the die, etc. Different ratios may also be used on the same die, wherein more lubrication is applied to problematic areas, typically to locations experiencing heat build up due to the configuration of the die. Moreover, individual dies may have multiple sprays sequentially applied thereto at different times during the casting process.

With reference to FIG. 4, a conventional die lubrication system 10 is illustrated to include a pressure intensifier 12, a die lube source 14, a die spray device 16, and a used die lube collection pan 18. The die lube source 14 is fluidly connected, via a pipe 20, a manually operated shut-off valve 21, and an inlet check valve 22, to the pressurizing cylinder 24 of the pressure intensifier 12. Controlled application of a hydraulic source 26 to the master piston 28 of the pressure intensifier moves the piston up and down to selectively draw die lube past the inlet check valve 22 and into the pressure intensifier pressurizing cylinder 24 and then expel pressurized die lube from the pressure intensifier pressurizing cylinder. Pressurized die lube flows through an outlet pipe 30 and outlet check valve 32 to the die spray device 16. The used die lube is collected in the collection pan 18 and directed to the drain 34 and, ultimately, to the plant wastewater treatment facility.

Unfortunately, this common practice is wasteful of die lube, which is relatively expensive and may be used many times if separated from contaminants. Moreover, the processing of waste die lube is a major source of the manufacturing facility waste treatment load. Therefore, there exists a need in the art for a method and device for cleaning and reusing die lube.

SUMMARY OF THE INVENTION

The present invention is directed toward a method and device for cleaning and reusing die lube.

In accordance with the present invention, a die lube recovery system includes a weir tank, an oil skimmer, a recovery pump, a filtration assembly, and a holding tank. The weir tank receives used die lube and includes means to filter large particles from the used die lube. The oil skimmer is associated with the weir tank and is operable to remove oil from the used die lubrication.

In further accordance with the present invention, the filtration assembly removes particulates from the used die lube output from the weir tank and supplies reconditioned die lube to the holding tank. The recovery pump forces fluid from an outlet of the weir tank to an input of the filtration assembly.

In further accordance with the present invention, the holding tank contains a quantity of reconditioned die lube and has a first sensor for monitoring a liquid level in the holding tank. When a sensed level of reconditioned die lube in the holding tank falls below a first predetermined level, fresh die lube is added to the holding tank.

The system according to the present invention further includes a fresh die lube source, a die lube pressure booster, and a die spraying device. The die lube source is fluidly connected, via a pipe and an automatically-operated valve, to the holding tank such that, when the sensed level of reconditioned die lube falls below the predetermined level, the automatically-operated valve is opened to permit fresh die lube to flow into the holding tank.

BRIEF DESCRIPTION OF THE DRAWINGS

These and further features of the present invention will be apparent with reference to the following description and drawings, wherein.

DETAILED DESCRIPTION OF THE PREFERRED EMBODIMENT

Figure 1:
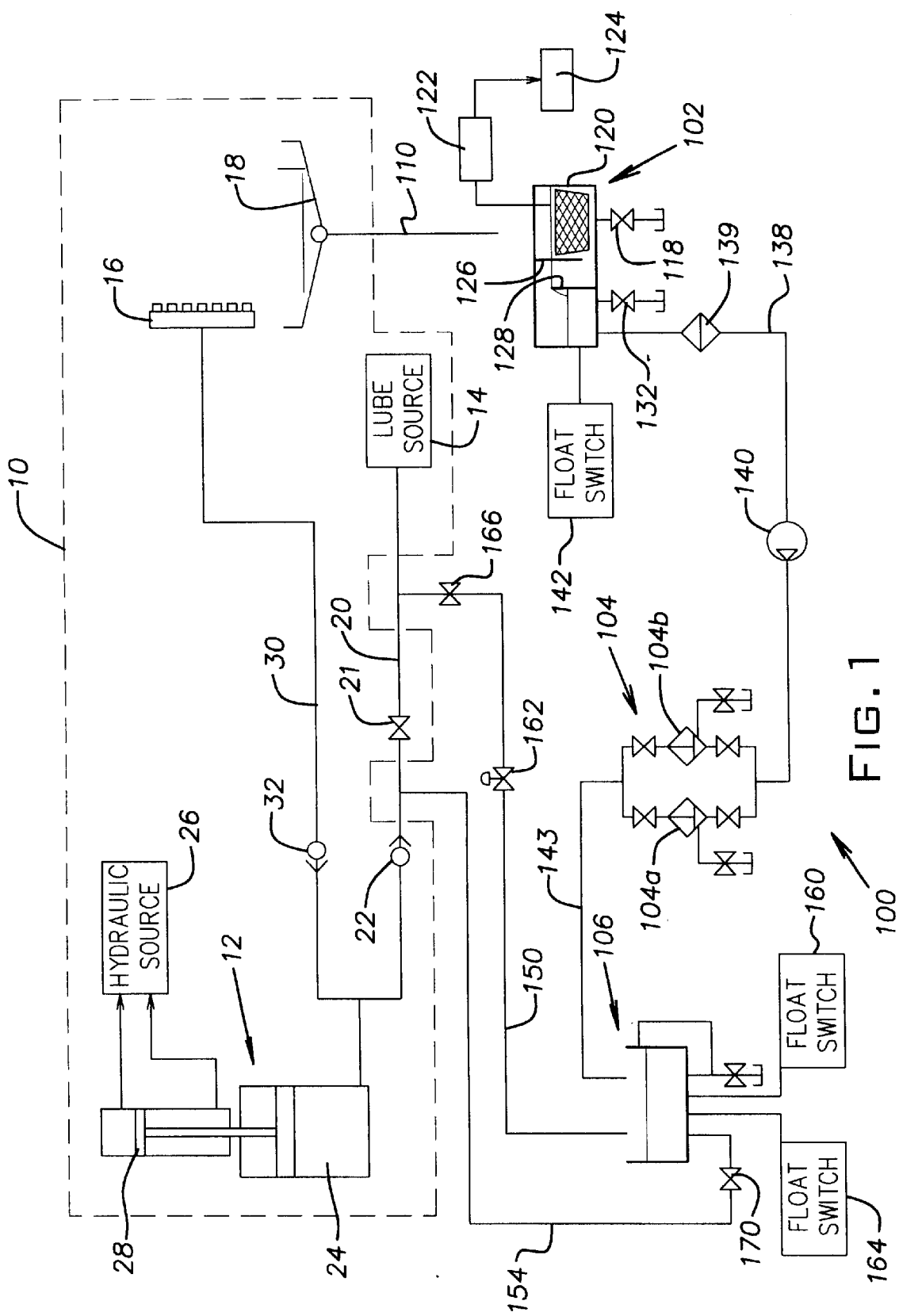
FIG. 1 schematically illustrates a die lube reclamation system according to the present invention.

It should be noted that in the following detailed description, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

With reference to FIG. 1, a die lube recovery system 100 is schematically illustrated. The system 100 includes a weir tank 102, a filtration assembly 104, a holding tank 106, and a source of fresh die lube 14. The system further includes a hydraulic pump that serves as a die lube pressure booster 12 to supply pressurized die lube to the dies via the spray device 16, as will be clear from the following description.

Figure 2:
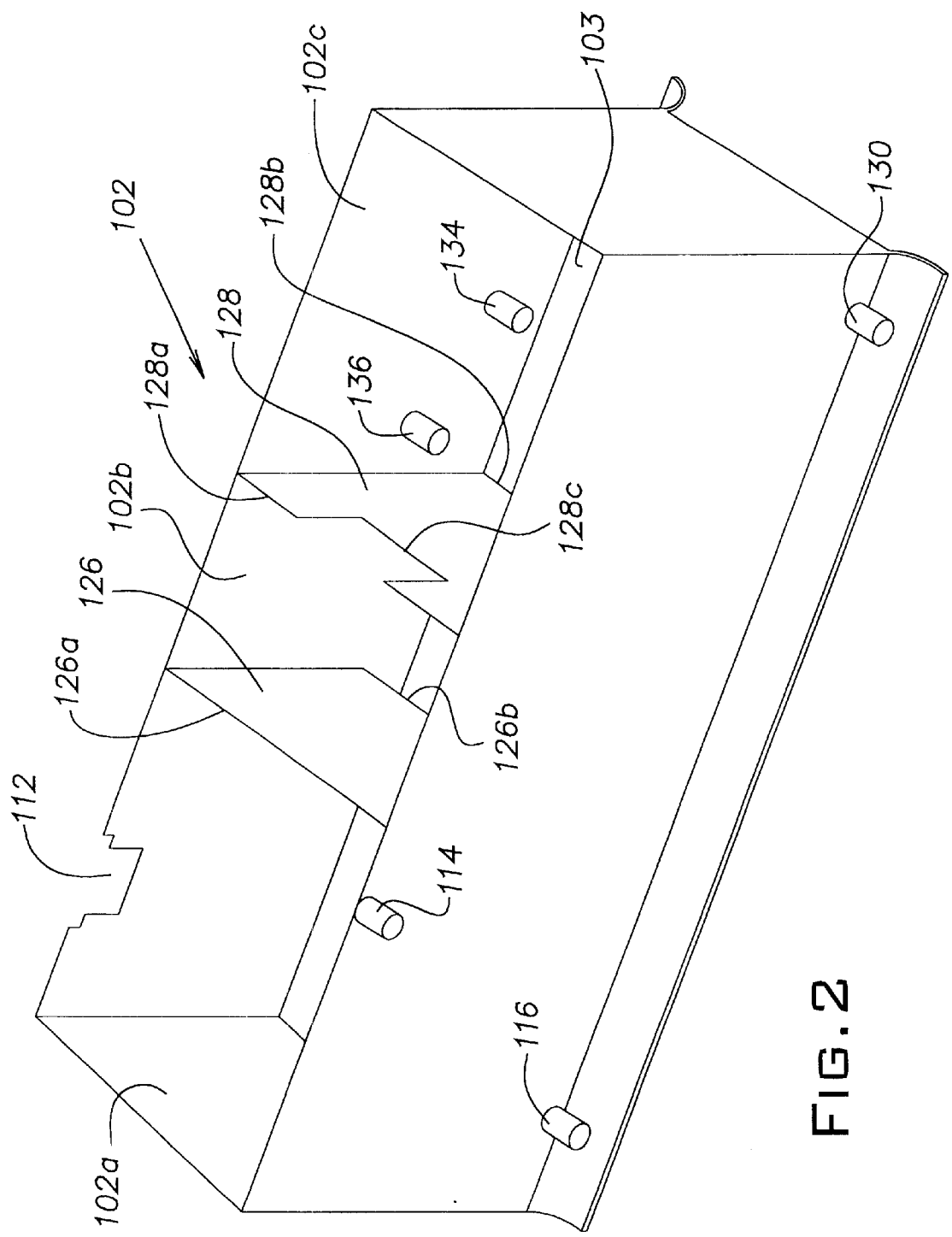
FIG. 2 is a perspective view of a weir tank according to the present invention.

A collection pan 18 directs used die lube, via a collection trough 110, to the weir tank 102 for gross filtration and oil removal. As shown best in FIG. 2, the weir tank 102 has three compartments: a first compartment 102a for gross filtration and oil skimming, a second or middle compartment 102b to limit transmission of floating and submerged particles, such as flashing, and a compartment 102c from which preliminarily cleaned die lube is output.

The first compartment 102a of the weir tank 102 has an inlet 112 at a top thereof through which flows dirty lube from the machine collection trough 110. Opposite the inlet 112 is an overflow connection 114 through which through which excess fluid can flow to drain, if necessary. A drain coupling 116 is also provided at a bottom of the first compartment 102a which, by means of a manually operated valve 118 (FIG. 1), permits the first compartment 102a to be drained of fluid for maintenance purposes. A basket-type mesh filter 120 (FIG. 1) is removably received in the first compartment 102a and is operable to remove larger particles entrained in the dirty stream of die lube entering the weir tank 102. The basket filter 120 is easily removed from the weir tank 102 and emptied, as will be desirable periodically. An oil skimmer 122 is preferably mounted at the first compartment 102a and is operable to remove waste oil from the fluid therein. The removed waste oil is delivered to a waste oil container 124 for recycling.

A first wall 126 separates the first and second compartments 102a, 102b and serves to contain floating debris within the first compartment 102a. An upper edge 126a of the first wall 126 is at least as high as the overflow connection 114, while a lower edge 126b of the wall 126 is spaced from a bottom wall 103 of the weir tank 102. Therefore, lube flows under the first wall 126 and into the second compartment 102b.

A second wall 128 separates the second compartment 102b from the third compartment 102c. A lower edge 128b of the second wall 128 is sealed to the bottom wall 103 of the weir tank 102 to prevent submerged debris from entering the third compartment 102c. An upper edge 102a of the second wall 128 has a notched-out portion 128c to permit an upper portion of the lube within the second compartment 102b to flow into the third compartment 102c.

The third compartment 102c has a drain coupling 130 at a bottom thereof. The third compartment 102c can be emptied of fluid by opening a manually operated valve 132 (FIG. 1) disposed in the line connected to the drain coupling 130. First and second outlet couplings 134, 136 are provided in the sidewall opposite the drain outlet 130 in the third compartment 102c. The first coupling 134 is relatively closer to the bottom wall 103 of the weir tank 102 and is connected, via a pipe 138 and a strainer 139, to a return pump 140 that supplies preliminarily filtered die lube to the filtration assembly 104. The second coupling 136 is used as a fluid connection for a float switch 142 (FIG. 1) that senses the lube level in the third compartment 102c and activates/deactivates the pump 140 accordingly.

As shown in FIG. 1, the pump 140 is provided downstream the weir tank 102 and is controlled, by means of the aforementioned float switch 142, to pump preliminarily filtered die lube to a pair of parallel-connected filter 104a, 104b of the filtration assembly 104. The return pump 140 is preferably a commercially available diaphragm-type air pump and pressurizes the preliminarily filtered die lube so as to force the lube through the filters 104a, 104b. The filters further clean the preliminarily filtered lube, and preferably are adapted to farther remove particulate matter, preferably including oil, from the fluids flowing therethrough. Suitable fluid connections and valving, as illustrated, is provided such that either of the filters 104a, 104b may be taken off-line for maintenance, cleaning and/or replacement of filter media. Each of the filters 104a, 104b includes a drain pipe, normally closed by a manually operated ball valve, to communicate fluid to the available trench drain, as will be desirable during back flushing or maintenance.

The further filtered lube (hereinafter referred to as reconditioned die lube) flows from the filtration assembly 104, through a pipe 143, and into the holding tank 106. In addition to receiving reconditioned die lube, the holding tank 106 is available to receive fresh die lube from the fresh die lube source 14. Reconditioned die lube from the holding tank is delivered to the die lube booster cylinder 12, which is operable to supply pressurized die lube to the die spray heads 16, as will be described hereinafter.

Figure 3:
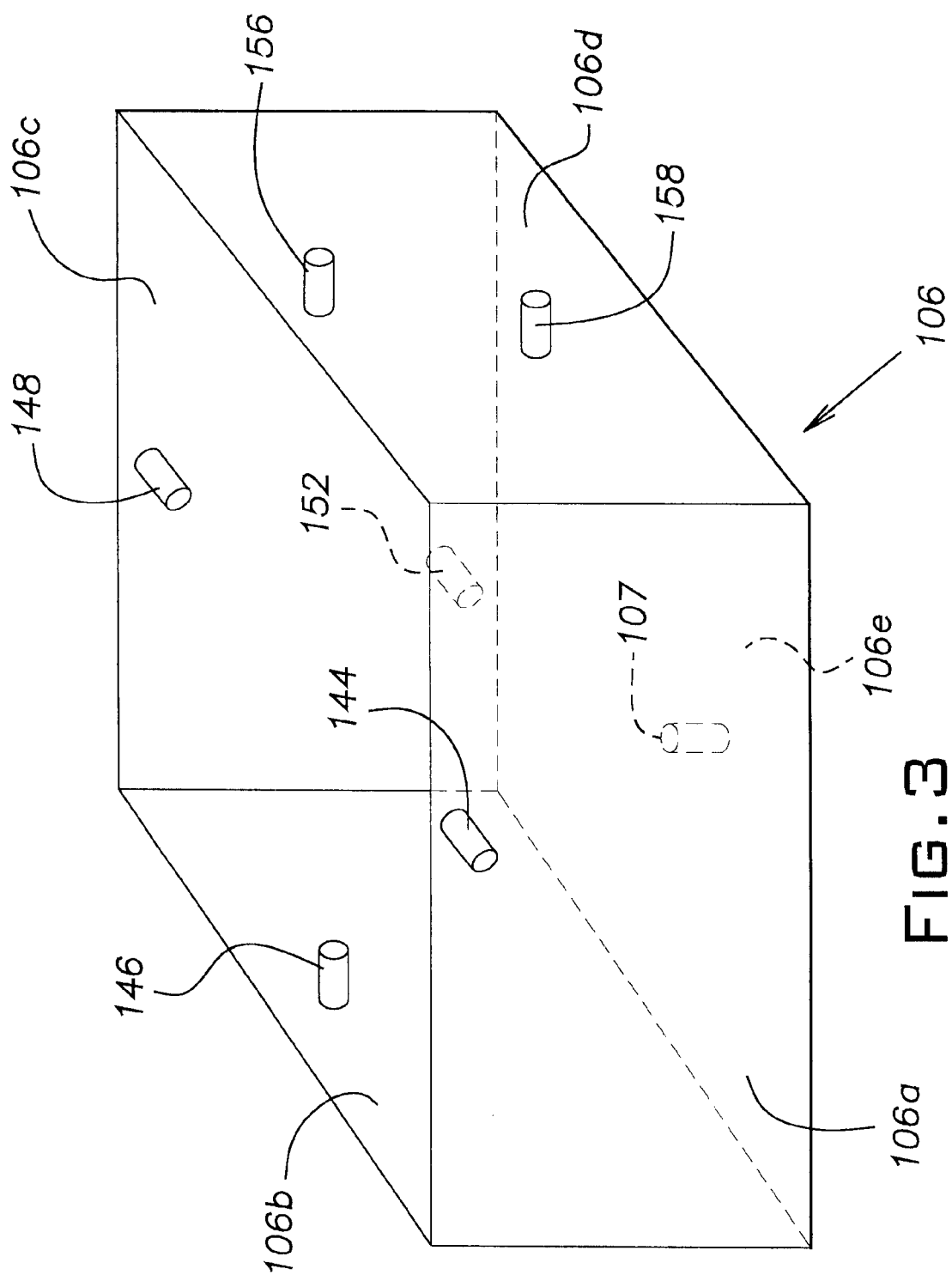
FIG. 3 is a perspective view of a holding tank according to the present invention; and, FIG. 4 schematically illustrates a conventional die lube system.
Figure 4:
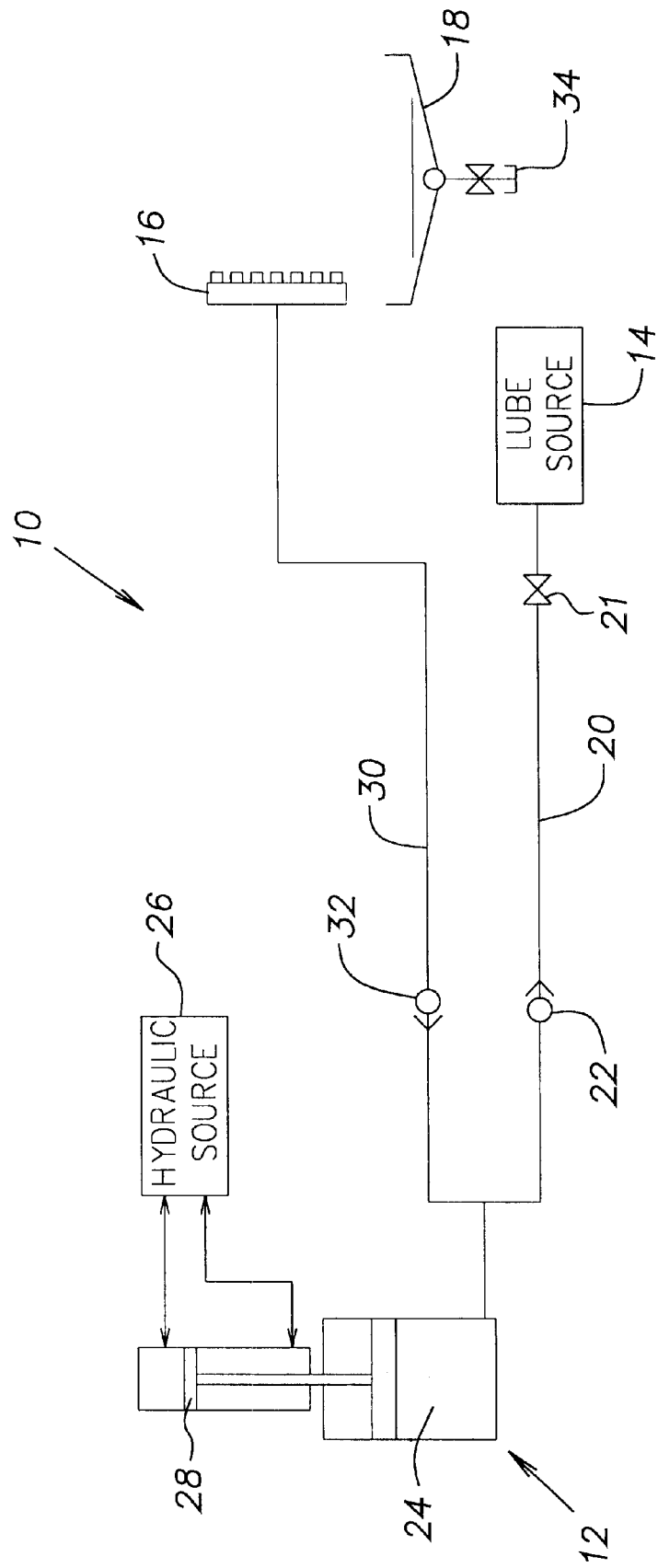

With reference to FIG. 3, the holding tank 106 defines a container having a series of upstanding sidewalls 106a, 106b, 106c, 106d and a bottom wall 106e. The bottom wall 106e has a drain fitting 107 therein to permit the holding tank 106 to be drained of fluid. A first sidewall 106a has an overflow coupling 144 at a top portion thereof that serves to direct excess fluid to drain. A second sidewall 106b has a coupling 146 at a top portion thereof that receives the pipe 143 extending from an output of the filtration assembly 104.

A third sidewall 106c has a coupling 148 at a top portion thereof that receives a holding tank fill pipe 158 extending from the fresh die lube source 14, to be described further hereinafter. The third sidewall 106c also has a larger coupling 152 at a bottom portion thereof through which reconditioned die lube flows toward the pressure intensifier 12 via a holding tank outlet pipe 154.

A fourth sidewall 106d has first and second switch couplings 156, 158. The first switch coupling 156 is disposed close to the top edge of the fourth sidewall 106d and is in fluid communication with a float switch 160 (FIG. 1) that activates/deactivates a solenoid valve 162. The solenoid valve 162 is operable to control introduction of fresh die lube (via the coupling 148) into the holding tank 106. The second switch coupling 158 is disposed relatively beneath the first switch coupling 156 and is in fluid communication with a float switch 164 (FIG. 1) that senses low fluid level in the holding tank 102 to initiate a cycle stop when the fluid level falls below the level of the second switch coupling 158. Each of the float switches 142, 160, 164 employed in the present invention preferably has a time delay associated with the switching function to prevent transient level fluctuations, as may be caused by turbulence in the tanks 102, 106, from negatively affecting operation of the system 100.

With reference to FIG. 1, the die lube source 14 is fluidly connected, via a pipe 20, a first manually operated valve 21, and an inlet check valve 22, to the pressurizing cylinder 24 of the pressure intensifier 12. Between the die lube source 14 and the first manually operated valve 21, the pipe 20 is T-connected to a holding tank fill pipe 150 extending toward the holding tank 106 and connected to the connector 148. The holding tank fill pipe 150 has a second manually operated valve 166 and the solenoid valve 162 disposed therein. The solenoid valve 162 is opened/closed by the float switch 160 of the holding tank 106 to automatically control the introduction of fresh die lube into the holding tank 106. More specifically, when the reconditioned lube level in the holding tank 106 is lower than a first predetermined level, the float switch 160 closes to actuate or open the solenoid valve 162. When the reconditioned die lube level is greater than a second predetermined level, the float switch 160 opens, de-actuating and thereby closing the solenoid valve 162 and preventing further introduction of fresh die lube from the die lube source 14 into the holding tank 106.

The holding tank outlet pipe 154 is T-connected to the source pipe 20 relatively between the first manually operated valve 21 and the check valve 22, as illustrated. A third manually operated valve 170 is provided in the outlet pipe 154 near an outlet of the holding tank 106. The check valve 22 permits fluid flow only in a direction relatively toward the pressure intensifier 12, thereby preventing back-flow of reconditioned lube. As will be appreciated by those skilled in the art, the first manually operated valve 21 is normally closed, and the second and third manually operated valves 166, 170 are normally opened during operation of the die lube reclamation system 100. However, the first manually operated valve 21 can be opened, and the second and third valves 166, 170 closed, to take the die lube reclamation system 100 off-line, as may be necessary for significant repairs, such as should the pump fail. Closing the second and third valves 166, 170 will isolate the holding tank 106 from the die lube source 14.

Controlled application of a hydraulic source 26 to the piston 28 of the pressure intensifier 12 moves the piston up and down to selectively draw die lube into the pressure intensifier pressurizing cylinder 24 from the holding tank 106 and then expel pressurized die lube from the pressure intensifier pressurizing cylinder 24. Pressurized die lube flows through the outlet pipe 30 and outlet check valve 32, to the die spray device 16. The used die lube is collected by the die lube collection pan 18 and the recycling process continues again.

The present invention has been described herein with particularity, but it is noted that the scope of the invention is not limited thereto. Rather, the present invention is considered to be possible of numerous modifications, alterations, and combinations of parts and, therefore, is only defined by the claims appended hereto.

What is claimed is:

1. A die lube recovery system, comprising:
   a weir tank that receives used die lube, said weir tank having means to filter large particles from said used die lube;
   an oil skimmer associated with said weir tank and operable to remove waste oil from said used die lube;
   a filtration assembly for removing particulates from used die lube output from said weir tank and for supplying reconditioned die lube to a holding tank;
   a recovery pump for pumping fluid from an outlet of said weir tank to an input of said filtration assembly;
   said holding tank containing a quantity of reconditioned die lube and having a first sensor for monitoring a liquid level in said holding tank, wherein, when a sensed level of reconditioned die lube in said holding tank falls below a first predetermined level, fresh die lube is added to said holding tank.

2. The die lube recovery system according to claim 1, further comprising a fresh die lube source, a die lube pressure booster, and a die spraying device, said die lube source being fluidly connected, via a pipe and an automatically-operated valve, to said holding tank such that, when said sensed level of reconditioned die lube falls below said predetermined level, said automatically-operated valve is opened to permit fresh die lube to flow into said holding tank.

3. The die lube recovery system according to claim 2, wherein said weir tank also includes a sensor for monitoring liquid level in said weir tank such that, when the liquid level falls below a predetermined level, the sensor deactivates the pump to prevent further die lube from being pumped out of the weir tank.

4. The die lube recovery system according to claim 3, wherein following deactivation of said pump, when die lube levels return to said first predetermined level, said pump is reactivated.

5. The die lube recovery system according to claim 4, wherein said weir tank defines a first compartment, a second compartment, and a third compartment, wherein a first wall separates said first and second compartments and a second wall separates said second and third compartments.

6. The die lube recovery system according to claim 5, wherein said first compartment has an inlet for dirty die lube and serves to retain relatively heavy particles therein, the first wall has a lower edge that is spaced from a bottom wall of said weir tank such that lube flows underneath said first wall and into said second compartment, said second wall having a lower edge that is sealed to said weir tank bottom wall and an upper edge that is relatively lower than an upper edge of said first wall such that lube flows over said second wall upper edge and into said third compartment.

7. The die lube recovery system according to claim 6, wherein said third compartment has a die lube outlet and wherein lube levels in said third compartment are monitored by said sensor.

8. A die lube system, comprising a fresh die lube source, a pressure booster that is operable to receive, pressurize, and deliver die lube to a lube spray device, and a used die lube collection pan that receives die lube after the die lube has been sprayed from the lube spraying device, the improvement comprising:
   a weir tank that receives used die lube from said collection pan, said weir tank having means to filter large particles from said used die lube;
   an oil skimmer associated with said weir tank and operable to remove waste oil from said used die lube;
   a filtration assembly for removing particulates from used die lube output from said weir tank and for supplying reconditioned die lube to a holding tank;
   a recovery pump for pumping fluid from an outlet of said weir tank to an input of said filtration assembly;
   said holding tank containing a quantity of reconditioned die lube and having a first sensor for monitoring a liquid level in said holding tank, wherein, when a sensed level of reconditioned die lube in said holding tank falls below a first predetermined level, fresh die lube liquid is added to said holding tank from said fresh die lube source; and,
   wherein said holding tank is fluidly connected to said pressure booster and supplies reconditioned die lube thereto.

9. The die lube system according to claim 8, wherein said die lube source is fluidly connected, via a pipe and an automatically-operated valve, to said holding tank such that, when said sensed level of reconditioned die lube falls below said predetermined level, said automatically-operated valve is opened to permit fresh die lube to flow into said holding tank.

10. The die lube system according to claim 9, wherein said weir tank also includes a sensor for monitoring liquid level in said weir tank such that, when the liquid level falls below a predetermined level, the sensor deactivates the pump to prevent further die lube from being pumped out of the weir tank.

11. The die lube system according to claim 10, wherein following deactivation of said pump, when die lube levels return to said first predetermined level, said pump is reactivated.

12. The die lube system according to claim 11, wherein said weir tank defines a first compartment, a second compartment, and a third compartment, wherein a first wall separates said first and second compartments and a second wall separates said second and third compartments.

13. The die lube system according to claim 12, wherein said first compartment has an inlet for dirty die lube and serves to retain relatively heavy particles therein, the first wall has a lower edge that is spaced from a bottom wall of said weir tank such that lube flows underneath said first wall and into said second compartment, said second wall having a lower edge that is sealed to said weir tank bottom wall and an upper edge that is relatively lower than an upper edge of said first wall such that lube flows over said second wall upper edge and into said third compartment.

14. The die lube system according to claim 13, wherein said third compartment has a die lube outlet and wherein lube levels in said third compartment are monitored by said sensor.

15. A method for recovering and recycling used die lube, comprising the steps of:

directing used die lube and entrained particles to a weir tank, filtering large particles from the used die lube in the weir tank;

pumping filtered die lube from said weir tank, through a filter assembly, and delivering reconditioned die lube into a holding tank;

monitoring a level of the reconditioned die lube in said holding tank and, when the level is below a first predetermined level, adding further fresh lube to said holding tank.

16. The method according to claim 15, comprising the further steps of:

withdrawing reconditioned die lube from said holding tank; and, pressurizing and spraying said withdrawn die lube on a die in a casting machine.

17. The method according to claim 16, comprising the further steps of:

when the lube level in said holding tank is below a second predetermined level, turning off the casting machine to prevent the casting machine from operating without said pressurized spray of reconditioned die lube.

18. The method according to claim 15, comprising the further steps of:

monitoring a level of lube in a portion of said weir tank and, if said weir tank lube level falls below a predetermined level, turning said pump off.

* * * * *

UNITED STATES PATENT AND TRADEMARK OFFICE
CERTIFICATE OF CORRECTION

PATENT NO.   : 6,616,848 B2
DATED        : September 9, 2003
INVENTOR(S)  : Steiner It is certified that error appears in the above-identified patent and that said Letters Patent is hereby corrected as shown below:

<u>Column 2,</u>
Line 54, after "a", insert -- third --.

Signed and Sealed this

Thirtieth Day of December, 2003

JAMES E. ROGAN
*Director of the United States Patent and Trademark Office*